No. 771,293. PATENTED OCT. 4, 1904.
A. E. AVERRETT.
ALTERNATING CURRENT INDUCTION MOTOR.
APPLICATION FILED JAN. 26, 1903.
NO MODEL.
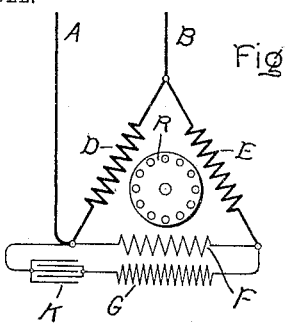
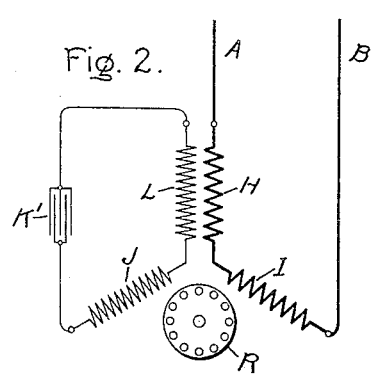
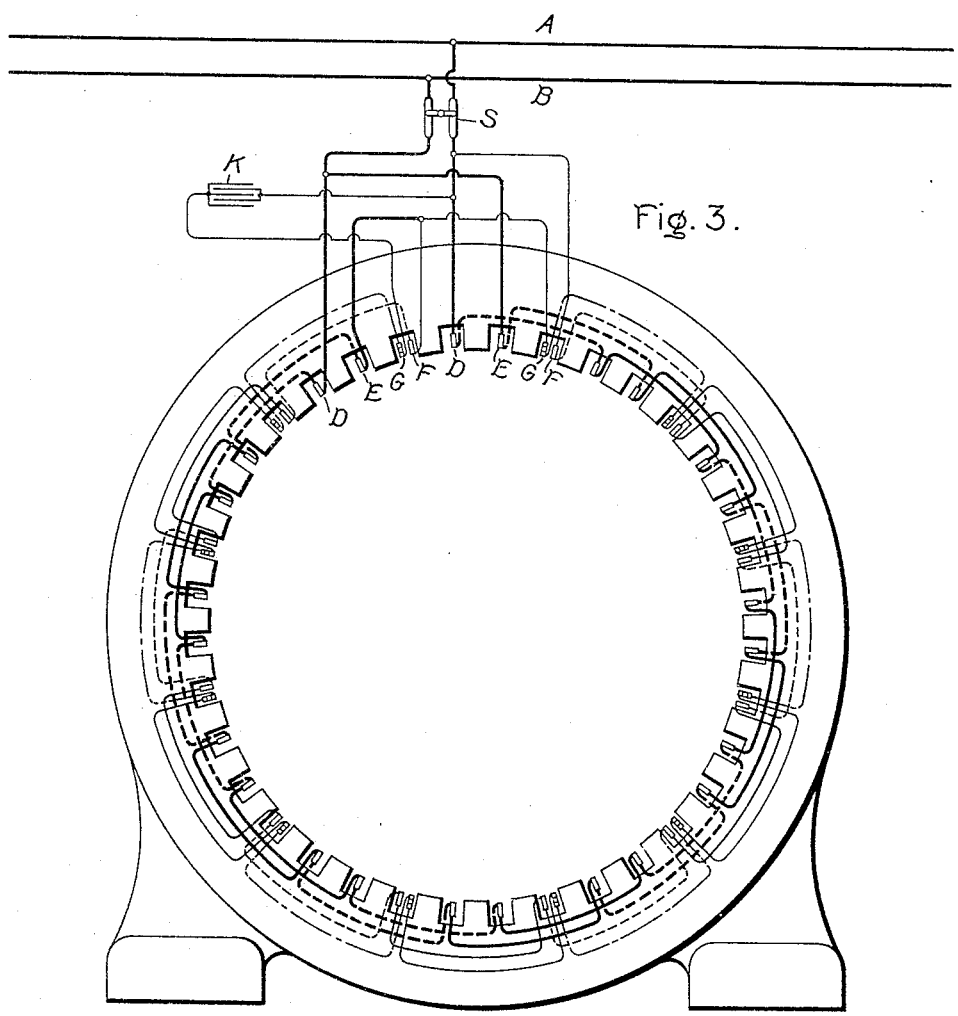
Witnesses.
George W. Tilden.
Helen Oxford
Inventor.
Andrew E. Averrett.
by Albert G. Davis
Att'y.

No. 771,293.

Patented October 4, 1904.

UNITED STATES PATENT OFFICE.

ANDREW E. AVERRETT, OF SCHENECTADY, NEW YORK, ASSIGNOR TO GENERAL ELECTRIC COMPANY, A CORPORATION OF NEW YORK.

ALTERNATING-CURRENT INDUCTION-MOTOR.

SPECIFICATION forming part of Letters Patent No. 771,293, dated October 4, 1904.

Application filed January 26, 1903. Serial No. 140,465. (No model.)

*To all whom it may concern:*

Be it known that I, ANDREW E. AVERRETT, a citizen of the United States, residing at Schenectady, county of Schenectady, State of New York, have invented certain new and useful Improvements in Alternating-Current Induction-Motors, of which the following is a specification.

My invention relates to alternating-current induction-motors adapted to be operated from a single-phase source of supply, and is an improvement on the motor devised by C. P. Steinmetz and described in Patents Nos. 602,920 and 602,921, granted April 26, 1898.

In motors of the construction to which my invention relates there is provided a primary winding adapted to be connected to a single-phase source of supply, a secondary winding carried by a member which is rotatable with respect to the member on which the primary winding is mounted, a tertiary winding mounted in fixed relation with respect to the primary winding and angularly displaced therefrom, and a phase-shifting device consisting of a condenser or its equivalent so connected to the tertiary winding as to cause the current flowing therein to differ in phase from the induced electromotive force.

In the actual construction of motors of the character above described it has heretofore been customary to provide the motors with polyphase delta-connected windings of the character illustrated in Figs. 2 and 3 of Patent No. 602,921, above referred to. In such a winding it is of course essential, in order to avoid unbalancing, that the several sections or component windings of the delta should have the same number of turns, and therefore when one of the sections of such a winding is to be used as a tertiary with a condenser or other suitable phase-shifting device connected across its terminals either the condenser must be constructed for a potential equal to the potential of the source of supply, from which the motor is operated, or else it may be connected with the terminals of the tertiary winding inductively through a compensator or transformer having a proper ratio of transformation to give the desired potential at the condenser-terminals.

The output of a condenser is measured by the product of the square of the electromotive force at its terminals and its capacity, so that if a condenser is to be connected directly to the terminals of the winding constituting the tertiary it must have a relatively large capacity, and must therefore be of large size. In the practical construction of motors of the character above specified it has therefore been found necessary, in order to keep the size of the condenser which constitutes the phase-shifting devices within reasonable limits, to employ a transformer between the tertiary windings and the condenser for the purpose of raising the potential at the condenser-terminals above that existing between the terminals of the tertiary winding. Thus, for example, in operating motors upon one hundred and ten and two hundred and twenty volts circuits it has been found advisable to introduce a transformer between the terminals of the tertiary winding and the terminals of the condenser having such a ratio of transformation that the potential condenser-terminals will be at least five hundred volts. In the smaller sizes of motors the transformer, which is required to raise the potential to the desired amount, may be nearly as large as the motor itself, and it is of course subject to the energy losses usual to such apparatus.

It is the object of my present invention to do away with such a separate piece of apparatus and the energy losses incident thereto and still to maintain the desired potential across the condenser-terminals. I accomplish this by causing the winding of the motor itself to act as a transformer to give the desired voltage, either by disposing the tertiary winding inductively to the primary and rotor windings, so that the tertiary acts as the secondary of an ordinary transformer, or by the equivalent arrangement of forming the tertiary winding as an extension of part of the primary winding, so that it acts as an ordinary autotransformer.

Inasmuch as the function of the tertiary winding is to produce a magnetization which will act, together with the magnetization due to the primary winding, to produce a rotation of the secondary member, the actual number of turns in the tertiary winding may be varied without affecting the operation of the motor so long as the ampere-turns in the said winding are maintained substantially the same.

According to my invention therefore I construct the tertiary winding of relatively fine wire, having many turns as compared with the primary winding, and in the case of a delta-connected motor-winding I may include in the delta connection such a portion of the total number of turns of the tertiary as may be required to give a balanced system of electromotive forces in the component windings constituting the delta, or the primary and tertiary windings may be wholly distinct, the primary forming a complete delta and the tertiary being merely in inductive relation to the primary and not electrically connected thereto. In a Y-connected motor I connect two of the phases of the primary in series, making the slots enough larger to allow for an additional tertiary winding of a large number of turns of fine wire, so as to get the required high-voltage effect; but the tertiary winding is not in this case metallically connected with the main source of supply.

By the use of my invention I am enabled to produce at the terminals of the tertiary winding itself a potential high enough so that the condenser may be directly connected thereto without the interposition of a potential-transforming device. Since the current flowing in the tertiary winding may be reduced in proportion as the number of turns in the winding are increased, it is possible in a motor provided with a delta-winding to place the tertiary winding thus modified in slots of the same size as have been heretofore employed in such motors, and in a Y-connected motor the slots need be only slightly larger.

My invention will be better understood by reference to the following description, taken in connection with the accompanying drawings, in which—

Figure 1 is a diagram illustrating an application of my invention to a delta-connected motor. Fig. 2 is a diagram illustrating my invention as applied to a Y-connected motor; and Fig. 3 is an elevation of the primary member of an alternating-current motor, illustrating the distribution of the windings in a multipolar motor wound according to the diagram of Fig. 1.

Referring to Fig. 1, D and E represent two of the component windings or sections of a three-phase delta-connected primary winding, these windings being angularly displaced from one another by one-third of the polar pitch, as is customary in three-phase motors. The secondary winding is mounted upon the movable member R and is indicated as a multiphase closed-circuit or squirrel-cage winding of the type ordinarily used in induction-motors. The tertiary winding comprises two sections F and G, wound in the same slots and displaced by one-third of the polar pitch from each of the windings D and E. The section F comprises a number of turns equal to the number of turns in the windings D and E, and forming therewith a delta-connected three-phase primary winding balanced with respect to number of turns. The section F in this arrangement therefore forms part of the primary delta-winding and part also of the tertiary winding, and the section G includes such additional turns as may be necessary to give the desired potential at the condenser-terminals. Because the number of turns in the section F of the tertiary winding is equal to the number of turns in the sections D and E the delta connection comprising the sections D, E, and F will evidently be the seat of a balanced system of electromotive forces, both with respect to the impressed voltage and to the primary and secondary windings, and since the entire tertiary winding comprises in addition to the section F another section, G, which may have any desired number of turns, limited only by the space available in the slots of the primary member of the motor, the potential at the terminals of the tertiary winding may be made anything desired within the limits stated, and consequently a condenser K, of relatively small capacity and directly connected to the terminals of the tertiary winding, will suffice to produce the required shifting-in phase of the current in the tertiary circuit.

It is not essential that the primary and tertiary windings should have a portion of their turns in common. The primary winding may be closed independently of the tertiary winding, and the tertiary winding may be disposed simply in inductive relation to the primary winding without electrical connection thereto. Thus, for example, in Fig. 2, which illustrates an application of my invention to a Y-connected three-phase motor, the windings H and I, angularly displaced from each other by one-third of the polar pitch, constitute the primary winding of the motor. The secondary winding is mounted on the movable member R, as before. The windings L and J constitute in this case the tertiary winding, and they have a large number of turns as compared with the primary winding and are wound with a relatively fine wire. The winding L is placed in the same slots with the winding H, while the winding J is displaced by one-third of the polar pitch from each of the windings H and I. The phase-shifting device, consisting of a condenser K', is connected across the terminals of the windings L and J.

In Fig. 3 I have illustrated the actual arrangement of a delta-connected three-phase winding arranged in accordance with my present invention and with a portion of the stator-turns common to both primary and tertiary windings on the primary member of a multipolar motor. The windings in this figure are lettered the same as in Fig. 1, and they may be readily traced by observing the following distinctions: The front connections of all the windings are shown in full lines, while the connections on the back of the primary member are shown in broken lines. The connections of the windings D and E are drawn in heavy lines and the connections of the windings G and F in fine lines, the distinction between the latter being that the back connections of winding F are represented by dotted lines, while those of the winding G are represented by dot-and-dash lines. In order to simplify the illustration, the windings are shown as comprising only a single conductor in each slot; but it will be evident that any desired number of turns may be employed.

The operation of a motor of this type is as follows: The motor being at rest, the closing of the switch S causes a current to flow from the supply-mains A and B through the windings D, E, and F, and a current is also generated by induction from the primary in the circuit including the tertiary winding and the condenser K. As soon as the secondary member begins to revolve current is also induced in the tertiary circuit from the primary winding through the secondary member, and if the capacity of the condenser is properly chosen the self-induction of the windings of the motor will be neutralized, and the motor will operate with increased efficiency, output, and power factor.

What I claim as new, and desire to secure by Letters Patent of the United States, is—

1. In an alternating-current motor, windings adapted for connection to a single-phase source and arranged to produce by induction in a portion of said windings a voltage in excess of the voltage of the source, and a phase-shifting device connected to said portion.

2. In an alternating-current motor, primary coils on one member connected to a source of single-phase current, short-circuited secondary coils on the other member, tertiary coils in inductive relation to the other coils and having a greater number of turns than the number of primary turns connected across the source, and a phase-shifting device connected to said tertiary coils.

3. In an alternating-current motor, primary stator-coils, short-circuited rotor-coils, tertiary coils adapted to be energized by induction from the other coils and to produce by said induction a voltage in excess of the voltage impressed on the primary coils, and a phase-shifting device connected to said tertiary coils.

4. In an alternating-current motor, coils on the primary member arranged to form a polyphase winding and connected to a single-phase source of supply, coils on the primary member arranged to have induced therein a voltage in excess of the voltage impressed on the first-named coils, and a phase-shifting device connected to the last-named coils.

5. In an alternating-current motor, primary coils on one member arranged to form a polyphase winding and connected to a single-phase source of supply, short-circuited secondary coils on the other member, tertiary coils on the first-named member in inductive relation to the secondary coils and adapted to have induced therein a voltage in excess of the voltage impressed on the primary coils, and a phase-shifting device connected to said tertiary coils.

6. An alternating-current induction-motor having a primary winding connected or adapted to be connected across the mains of a single-phase circuit, a closed circuit secondary member, a tertiary winding having many turns as compared with the said primary winding in inductive relation to the primary through the secondary member during the normal operation of the motor, and a phase-shifting device connected to the terminals of the tertiary winding.

7. In an alternating-current motor for single-phase circuits, the combination with the primary member, of a winding thereon comprising a plurality of sections connected in delta, certain of said sections being wound with the same number of turns and the other section or sections comprising a larger number of turns only a portion of which are included in the delta connection.

8. In an alternating-current motor for single-phase circuits, the combination with the primary member, of a winding thereon comprising three sections connected in delta and displaced from one another by approximately one-third of the polar pitch, two of said sections being wound with the same number of turns and the third comprising a larger number of turns only a portion of which are included in the delta connection, and a phase-shifting device connected to the terminals of the section having the larger number of turns.

9. In an alternating-current motor for single-phase circuits, the combination of a primary member provided with delta-connected windings displaced from one another by approximately one-third of the polar pitch, one of said windings having many turns as compared with the others and having only a portion of its turns included in the delta connection, a phase-shifting device connected across the terminals of the winding having many turns, and connections from another of said windings to a single-phase source of supply.

In witness whereof I have hereunto set my hand this 24th day of January, 1903.

ANDREW E. AVERRETT.

Witnesses:
BENJAMIN B. HULL,
HELEN ORFORD.